United States Patent
Shibata et al.

(10) Patent No.: US 7,560,891 B2
(45) Date of Patent: Jul. 14, 2009

(54) POSITION CONTROL APPARATUS

(75) Inventors: Tomohiro Shibata, Aichi (JP); Tomohisa Kameyama, Aichi (JP)

(73) Assignee: Okuma Corporation, Oguchi-cho, Niwa-gun, Aichi (JP)

( * ) Notice: Subject to any disclaimer, the term of this patent is extended or adjusted under 35 U.S.C. 154(b) by 21 days.

(21) Appl. No.: 11/706,028

(22) Filed: Feb. 14, 2007

(65) Prior Publication Data
US 2007/0194740 A1 Aug. 23, 2007

(30) Foreign Application Priority Data
Feb. 15, 2006 (JP) ............................. 2006-037556

(51) Int. Cl.
G05D 23/275 (2006.01)
(52) U.S. Cl. .................. 318/632; 318/560; 318/661
(58) Field of Classification Search ............. 318/560, 318/632, 661
See application file for complete search history.

(56) References Cited

U.S. PATENT DOCUMENTS

| | | | | |
|---|---|---|---|---|
| 5,237,509 A * | 8/1993 | Ueta et al. | ............. | 700/193 |
| 5,410,234 A * | 4/1995 | Shibata et al. | ............. | 318/700 |
| 5,808,462 A * | 9/1998 | Fujii et al. | ............. | 324/76.13 |
| 6,184,644 B1 * | 2/2001 | Eguchi | ............. | 318/632 |
| 6,313,591 B1 * | 11/2001 | Welker et al. | ............. | 318/34 |
| 6,316,899 B1 * | 11/2001 | Rastegar et al. | ............. | 318/568.1 |
| 6,470,225 B1 * | 10/2002 | Yutkowitz | ............. | 700/44 |
| 6,515,442 B1 | 2/2003 | Okubo et al. | | |
| 6,566,837 B1 * | 5/2003 | Zhang et al. | ............. | 318/610 |
| 6,998,810 B2 * | 2/2006 | Kameyama | ............. | 318/609 |
| 2001/0005800 A1 * | 6/2001 | Shiba et al. | ............. | 700/193 |

FOREIGN PATENT DOCUMENTS

| | | |
|---|---|---|
| CN | 1322311 A | 11/2001 |
| JP | HEI 3-032550 | 2/1991 |
| JP | HEI 10-326114 | 12/1998 |

OTHER PUBLICATIONS

First Office Action for corresponding Chinese Patent Application No. 200710084029.2 dated Jan. 23, 2009 and its English translation.

* cited by examiner

*Primary Examiner*—Bentsu Ro
*Assistant Examiner*—David S Luo
(74) *Attorney, Agent, or Firm*—McCarter & English, LLP (57) ABSTRACT

A deflection amount Ps representing a difference between a position detection value Pl of a driven body and a position detection value Pm of a motor is detected. A position calculator proportional constant Kp, a time constant Tp of a first-order lag circuit that inputs a the deflection amount Ps, and a time constant Tv of a first-order lag circuit that inputs a difference between a speed detection value Vl of the driven body and a speed detection value Vm of the motor are changed based on the deflection amount Ps.

4 Claims, 10 Drawing Sheets

POSITION CONTROL APPARATUS

PRIORITY INFORMATION

This application claims priority to Japanese Patent Application No. 2006-037556 filed on Feb. 15, 2006, which is incorporated herein by reference in its entirety.

BACKGROUND OF THE INVENTION

1. Field of the Invention

The present invention relates to a position control apparatus for a feed shaft (i.e., a driven body including a table, a saddle, and a spindle head) of a machine tool. More particularly, the present invention relates to the improvement of a position control apparatus that performs a full-close control for controlling a relationship between a driven body position and a position command value based on a deflection amount of a feed apparatus.

2. Description of the Related Art

A position control apparatus includes a linear scale provided on a movable portion of a machine tool to detect the position of a driven body. The position control apparatus can perform a full-close control reflecting a deflection amount of a feed apparatus based on a comparison between the detected driven body position and a command value. In such a position control apparatus, reducing a position error is required.

For example, a position error in a transient response can be suppressed by increasing a speed loop gain or a position loop gain, so that a driven body can be accurately controlled in response to an occurrence of unpredictable load change or disturbance, such as a sudden change in a slide resistance of a movable portion or a change in a cutting load.

However, a driving mechanism is not free from aging deterioration, such as abrasion of parts and looseness of parts. In continuous operations of a feed shaft mechanism, ball screw expansion occurs due to temperature increase and the tension of the ball screw decreases. Thus, the feed shaft mechanism is subjected to reduction in rigidity and causes low-frequency vibrations.

Figure 5:
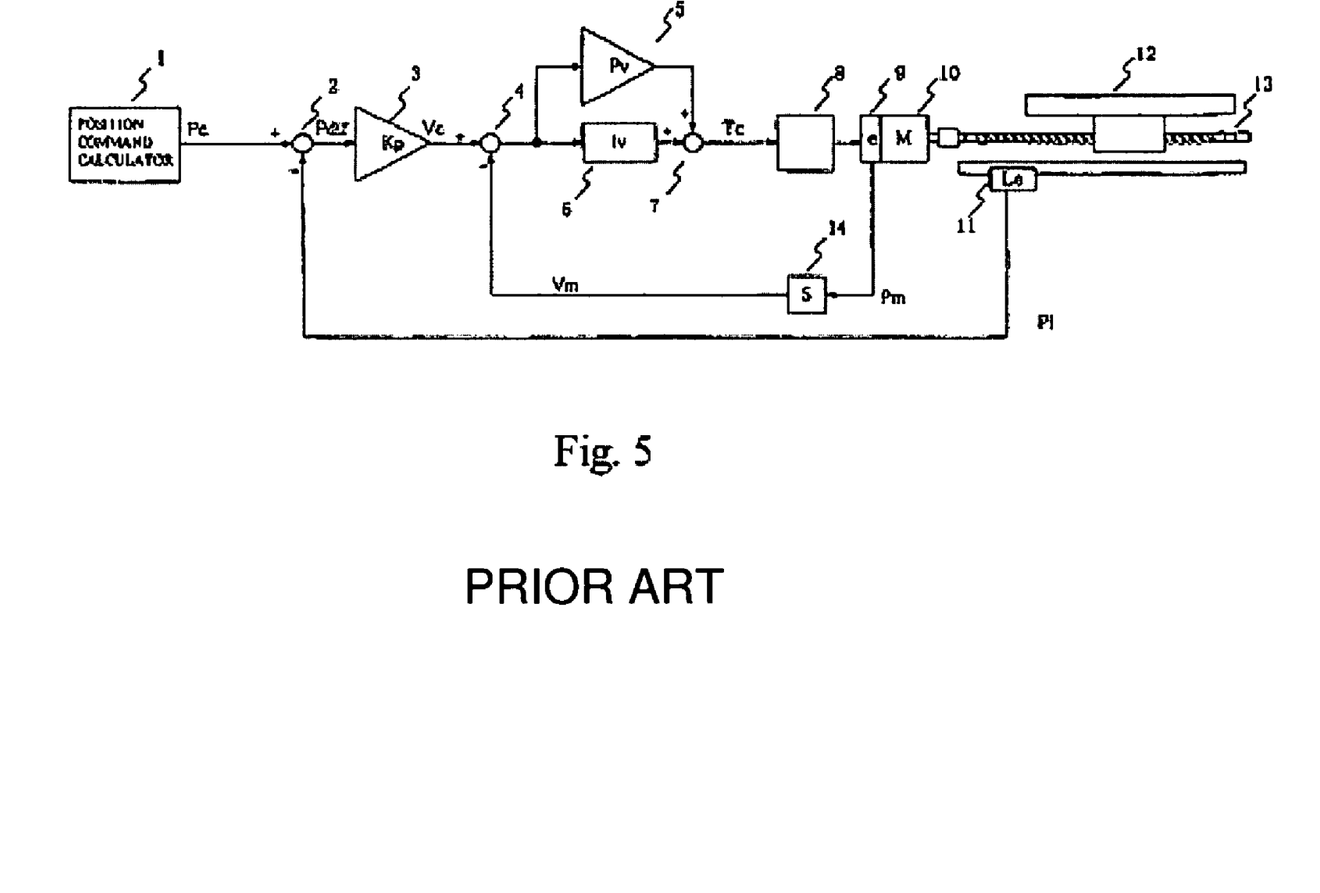
FIG. 5 illustrates a conventional full-close control system.

FIG. 5 illustrates a conventional full-close control system. A linear scale 11 detects a position detection value Pl of a driven body 12. A subtracter 2 calculates a deviation between a position command Pc and a position feedback value (i.e., the detected value Pl sent from the linear scale 11). A speed command calculating section 3 calculates a proportional constant Kp based on the position deviation and outputs a speed command Vc.

A position detector 9, attached to a motor 10, detects a position detection value Pm. A differentiator 14 differentiates the position detection value Pm and outputs a motor speed detection value Vm. A subtracter 4 obtains a deviation between the speed command Vc and the motor speed detection value Vm and outputs the obtained deviation as a speed deviation.

A speed deviation proportional calculator 5 outputs a speed deviation proportional component based on the speed deviation and a speed loop proportional gain Pv. A speed deviation integral calculator 6 outputs a speed deviation integral component based on the speed deviation and a speed loop integral gain Iv. An adder 7 adds the speed deviation proportional component and the speed deviation integral component and outputs a torque command Tc. The torque command Tc is sent to an integrated filtering and current-control section 8.

To simplify the explanation, it is now presumed that transfer characteristics from the speed command Vc to the motor speed detection value Vm is 1. In a presumed model, the driven body position Pl and the motor position Pm are connected by a spring having a spring coefficient Kb, the driven body has a weight M, and a slide torque F is generated in the driven body.

Figure 6:
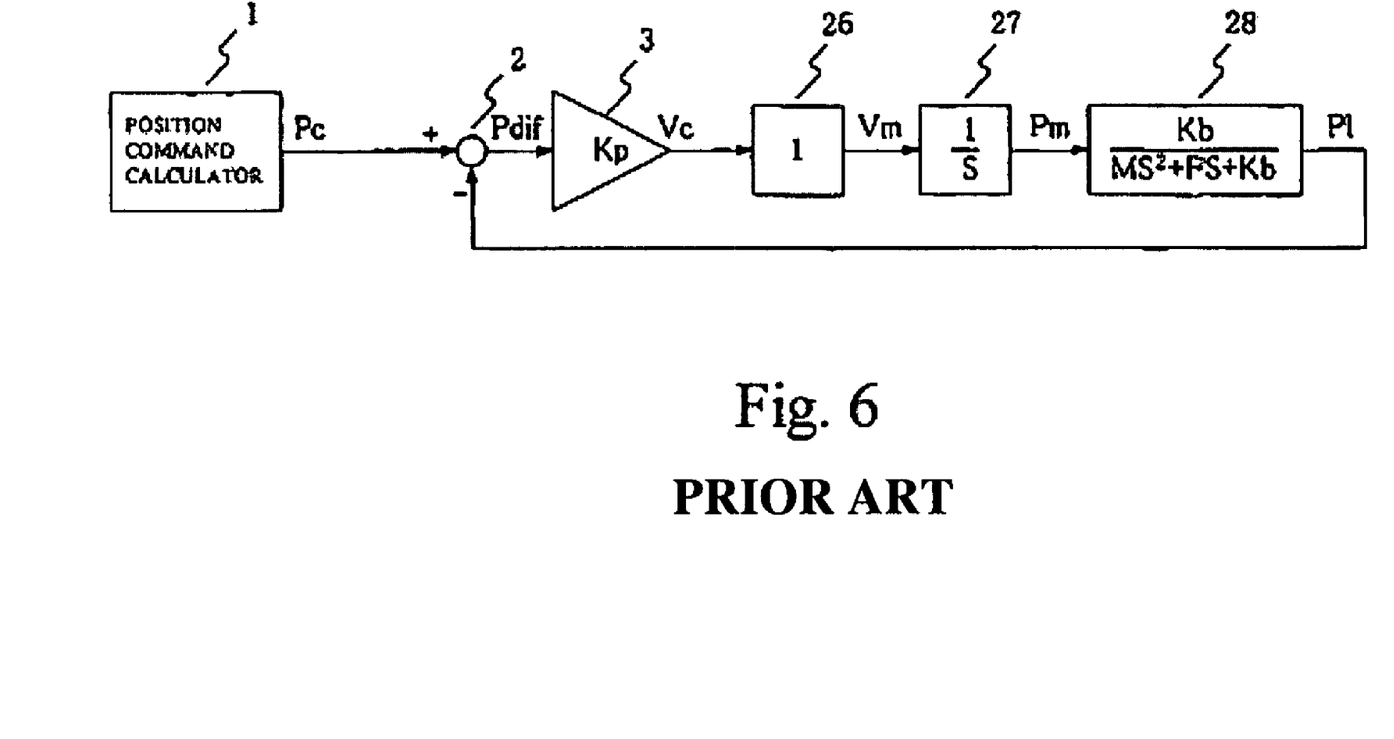
FIG. 6 is a block diagram illustrating a conventional full-close control system.

FIG. 6 is a block diagram illustrating the full-close control system shown in FIG. 5. A transfer function of the entire control system can be expressed by the following formula 1, in which S represents a Laplace operator.

$$Pc(S)/Pl(S)=Kp \cdot Kb/(MS^3+FS^2+Kb \cdot S+Kp \cdot Kb) \quad \text{(formula 1)}$$

Figure 9:
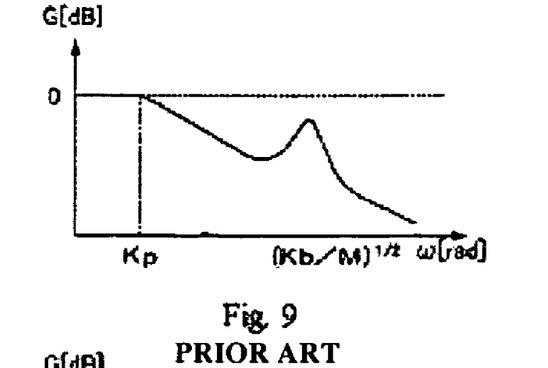
FIG. 9 is a graph illustrating gain characteristics according to the conventional full-close control system.

FIG. 9 illustrates gain characteristics of the entire control system in a condition where a relationship $Kp<<(Kb/M)^{1/2}$ is satisfied in the formula 1.

Recent development in various filtering techniques and/or vibration-damping controls and advanced speed loops enable setting of higher position and speed loop gains.

However, a driving mechanism is not free from aging deterioration, such as abrasion of parts and looseness of parts. In continuous operations of a feed shaft mechanism, ball screw expansion occurs due to temperature increase and the tension of the ball screw deteriorates. Thus, the feed shaft mechanism is subjected to reduction in rigidity.

Figure 10:
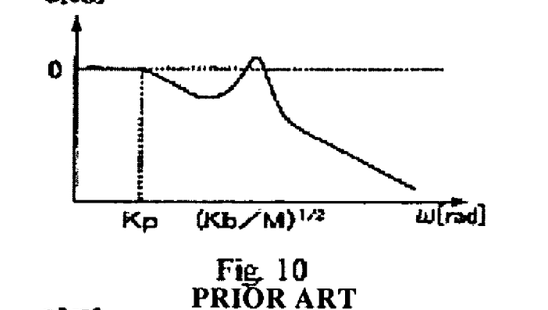
FIG. 10 is a graph illustrating gain characteristics according to the conventional full-close control system.

FIG. 10 illustrates gain characteristics of the entire control system expressed by the formula 1 in such a situation. As the position loop gain is set to a higher level, a gain margin at a mechanical resonance frequency $(Kb/M)^{1/2}$ becomes smaller. A driven body may cause low-frequency vibrations. To solve these drawbacks, there are conventional techniques.

Figure 7:
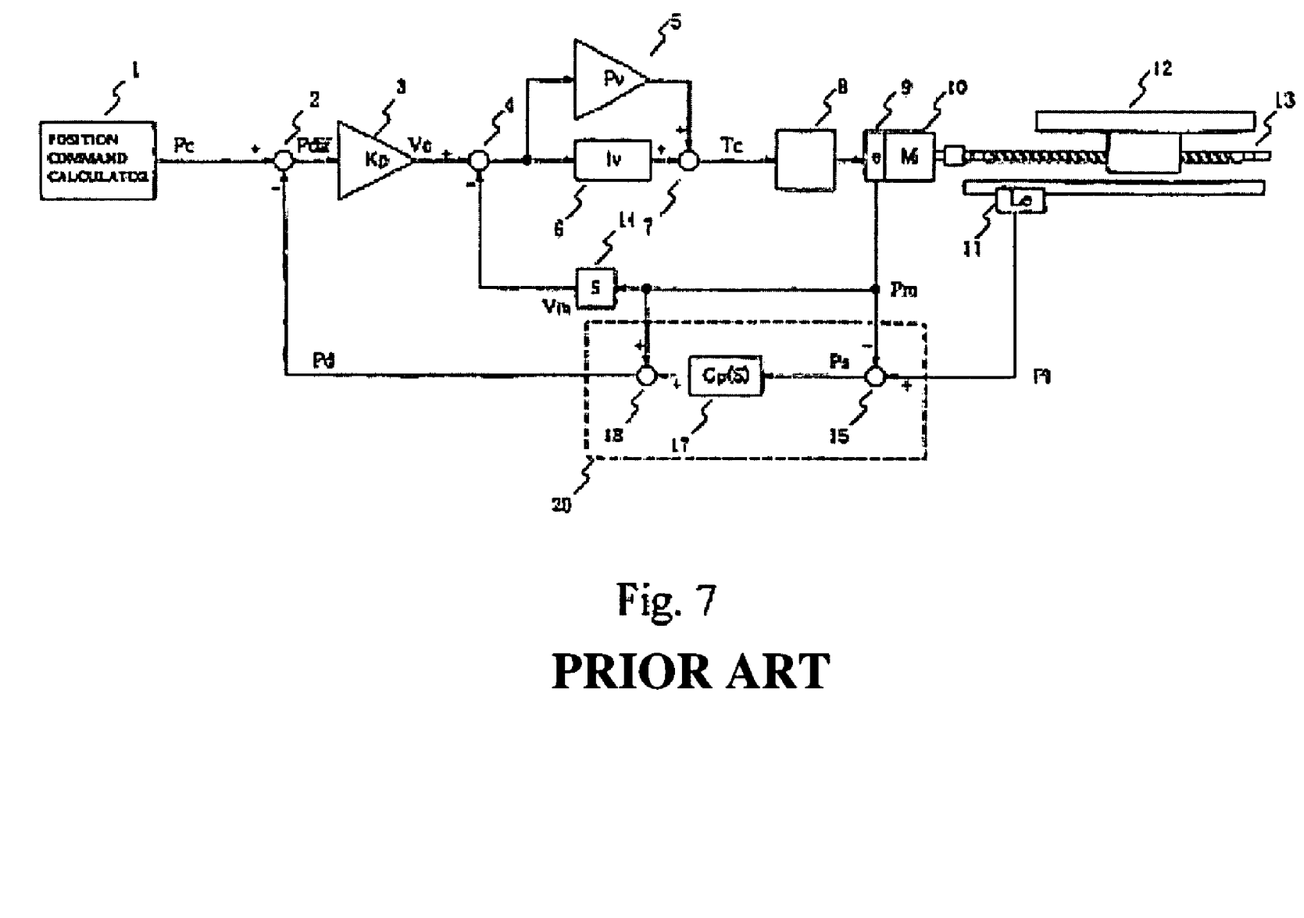
FIG. 7 illustrates a conventional full-close control system.

FIG. 7 illustrates another conventional full-close control system. In FIG. 7, elements similar to those disclosed in FIG. 5 are denoted by the same reference numerals and are not described below. The control system shown in FIG. 7 includes a position detection value calculating section 20 that receives the driven body position detection value Pl and the motor position detection value Pm and outputs a position feedback value Pd expressed by the following formula 2. In the formula 2, Tp represents a time constant of a first-order lag circuit 17 and S represents a Laplace operator.

$$Pd=Pm+(Pl-Pm)/(1+Tp \cdot S) \quad \text{(formula 2)}$$

In the formula 2, $(1+Tp \cdot S)$ represents a first-order lag. The first-order lag circuit 17 shown in FIG. 7 calculates a second term in the formula 2.

Figure 11:
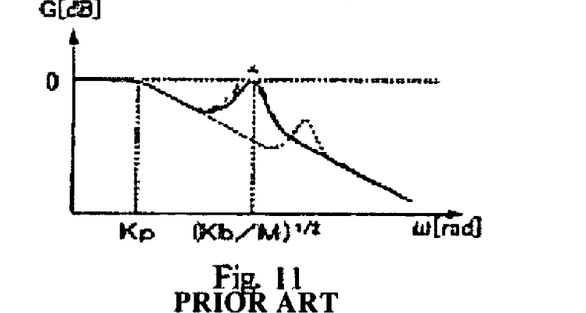
FIG. 11 is a graph illustrating gain characteristics according to the conventional full-close control system.

In FIG. 11, a dotted line illustrates gain characteristics of the entire control system shown in FIG. 7 in a condition where a relationship $Tp>>(Kb/M)^{1/2}$ is satisfied in the formula 2. A large gain margin can be obtained at a mechanical resonance frequency $(Kb/M)^{1/2}$.

Furthermore, in FIG. 11, a solid line illustrates gain characteristics of the entire control system in a condition where the rigidity of a feed shaft mechanism is deteriorated. Thus, the control system of FIG. 7 can solve the aforementioned problem (i.e., low-frequency vibration) occurring in the conventional example shown in FIG. 5.

In FIG. 11, an alternate long and short dash line illustrates the gain characteristics shown in FIG. 10.

Figure 8:
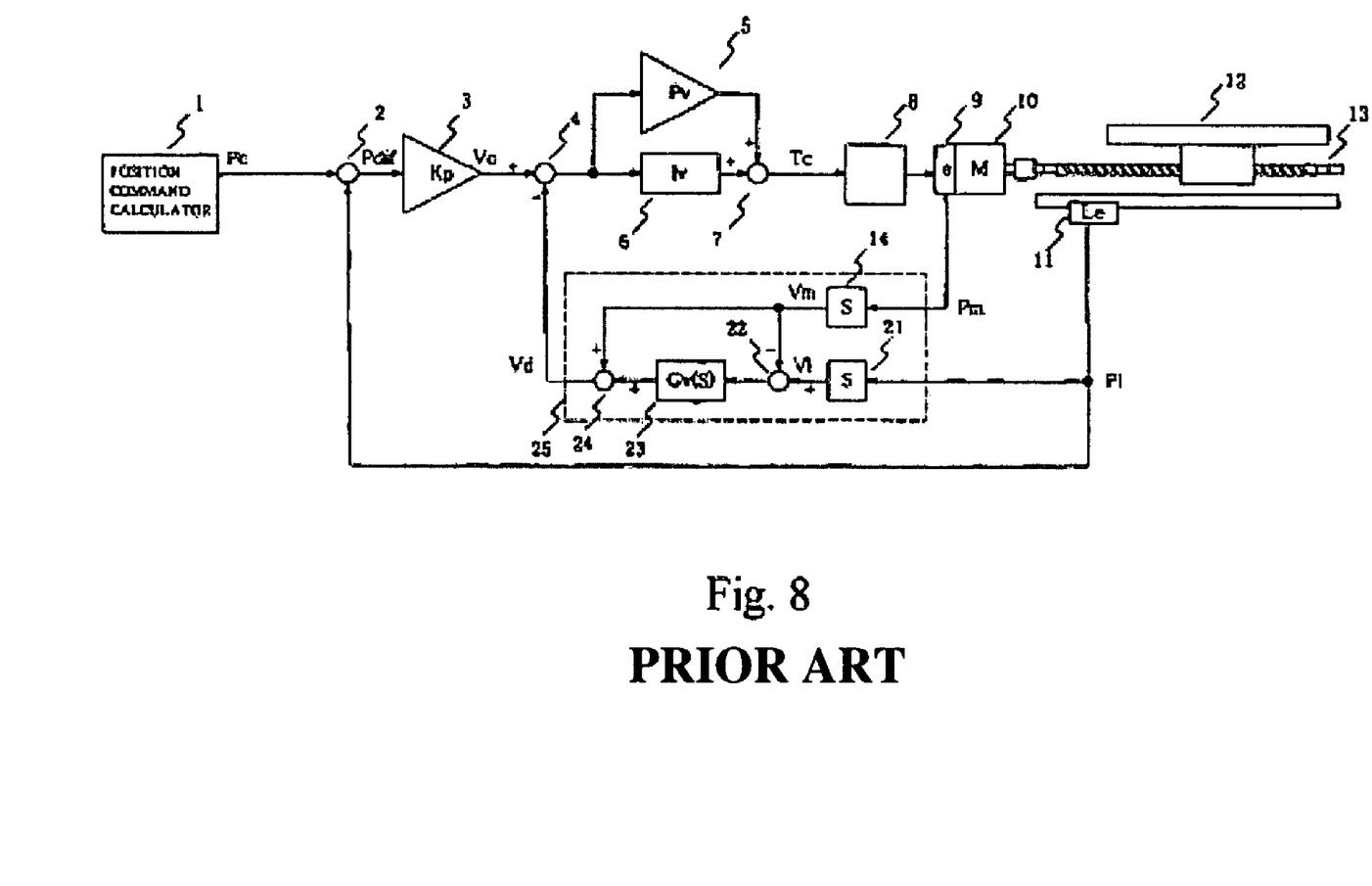
FIG. 8 illustrates a conventional full-close control system.

FIG. 8 illustrates other conventional full-close control system that includes a speed detection value calculator 25. In FIG. 8, elements similar to those disclosed in FIG. 5 are denoted by the same reference numerals and are not described below.

A differentiator 21 differentiates the driven body position detection value Pl and outputs a driven body speed detection value Vl. The speed detection value calculating section 25 outputs a speed feedback value Vd expressed by the following formula 3 based on the driven body speed detection value Vl and the motor speed detection value Vm. In the formula 3, Tv represents a time constant of a first-order lag circuit 23 and S represents a Laplace operator.

$$Vd=Vm+(Vl-Vm)/(1+Tv \cdot S) \quad \text{(formula 3)}$$

In the formula 3, (1+TvS) represents a first-order lag circuit. The first-order lag circuit 23 shown in FIG. 8 calculates a second term of the formula 3.

In FIG. 11, the dotted line illustrates gain characteristics of the entire control system shown in FIG. 8 in a condition where a relationship $Tv>>(Kb/M)^{1/2}$ is satisfied in the formula 3. A large gain margin can be obtained at a mechanical resonance frequency $(Kb/M)^{1/2}$.

Furthermore, the solid line of FIG. 11 illustrates gain characteristics of the entire control system in a condition where the rigidity of a feed shaft mechanism is deteriorated. Thus, the control system of FIG. 8 can solve the aforementioned problem (i.e., low-frequency vibration) occurring in the conventional example shown in FIG. 5.

In the conventional systems shown in FIGS. 7 and 8, the rigidity of a feed shaft driving mechanism gradually deteriorates due to mechanical aging deterioration. An excessively heavy workpiece may be mounted on a driven body in a large-scale machining center. In such cases, the gain margin at a mechanical resonance frequency $(Kb/M)^{1/2}$ becomes smaller and low-frequency vibrations may occur. Furthermore, a failed machine may be continuously driven in a situation where the rigidity of a feed shaft driving mechanism is deteriorated due to a mechanical failure. Also, the parts (e.g., a tack bearing) of a feed shaft mechanism may be damaged if low-frequency vibrations occur.

SUMMARY OF THE INVENTION

According to an aspect of the present invention, a position control apparatus which performs full-close control for controlling a position of a driven body driven by a motor, the apparatus comprising: a motor position detector; a driven body position detector configured to detect the position of the driven body; a subtracter configured to calculate a deflection amount representing a difference between a position detection value obtained from the motor position detector and a position detection value obtained from the driven body position detector; and a deflection detector configured to change a proportional constant of a speed command calculator based on the deflection amount.

According to another aspect of the present invention, a position control apparatus which performs full-close control for controlling a position of a driven body driven by a motor, the apparatus comprising: a motor position detector; a driven body position detector configured to detect the position of the driven body; a subtracter configured to calculate a deflection amount representing a difference between a position detection value obtained from the motor position detector and a position detection value obtained from the driven body position detector; a position detection value calculator configured to add an output of a first-order lag circuit inputting the deflection amount to the position detection value obtained from the motor position detector and output a position feedback value; and a deflection detector configured to change a first-order lag circuit time constant of the position detection value calculator based on the deflection amount.

According to yet another aspect of the present invention, a position control apparatus which performs full-close control for controlling a position of a driven body driven by a motor, the apparatus comprising: a motor position detector; a driven body position detector configured to detect the position of the driven body; a subtracter configured to calculate a deflection amount representing a difference between a position detection value obtained from the motor position detector and a position detection value obtained from the driven body position detector; a speed detection value calculator configured to add an output of a first-order lag circuit to the motor speed detection value and output a speed feedback value, wherein the first-order lag circuit inputs a difference between a motor speed detection value obtained from a motor position detection value and a driven body speed detection value obtained from a driven body position detection value; and a deflection detector configured to change a first-order lag circuit time constant of the speed detection value calculator based on the deflection amount.

Furthermore, it is desirable that the position control apparatus further includes a deflection detector configured to determine whether the deflection amount exceeds a predetermined threshold and display a status of the deflection amount when the deflection amount exceeds the threshold.

BRIEF DESCRIPTION OF THE DRAWINGS

The accompanying drawings, which are incorporated in and constitute a part of the specification, illustrate an embodiment of the invention and, together with the description, serve to explain the principles of the invention, in which.

DESCRIPTION OF PREFERRED EMBODIMENTS

Figure 1:
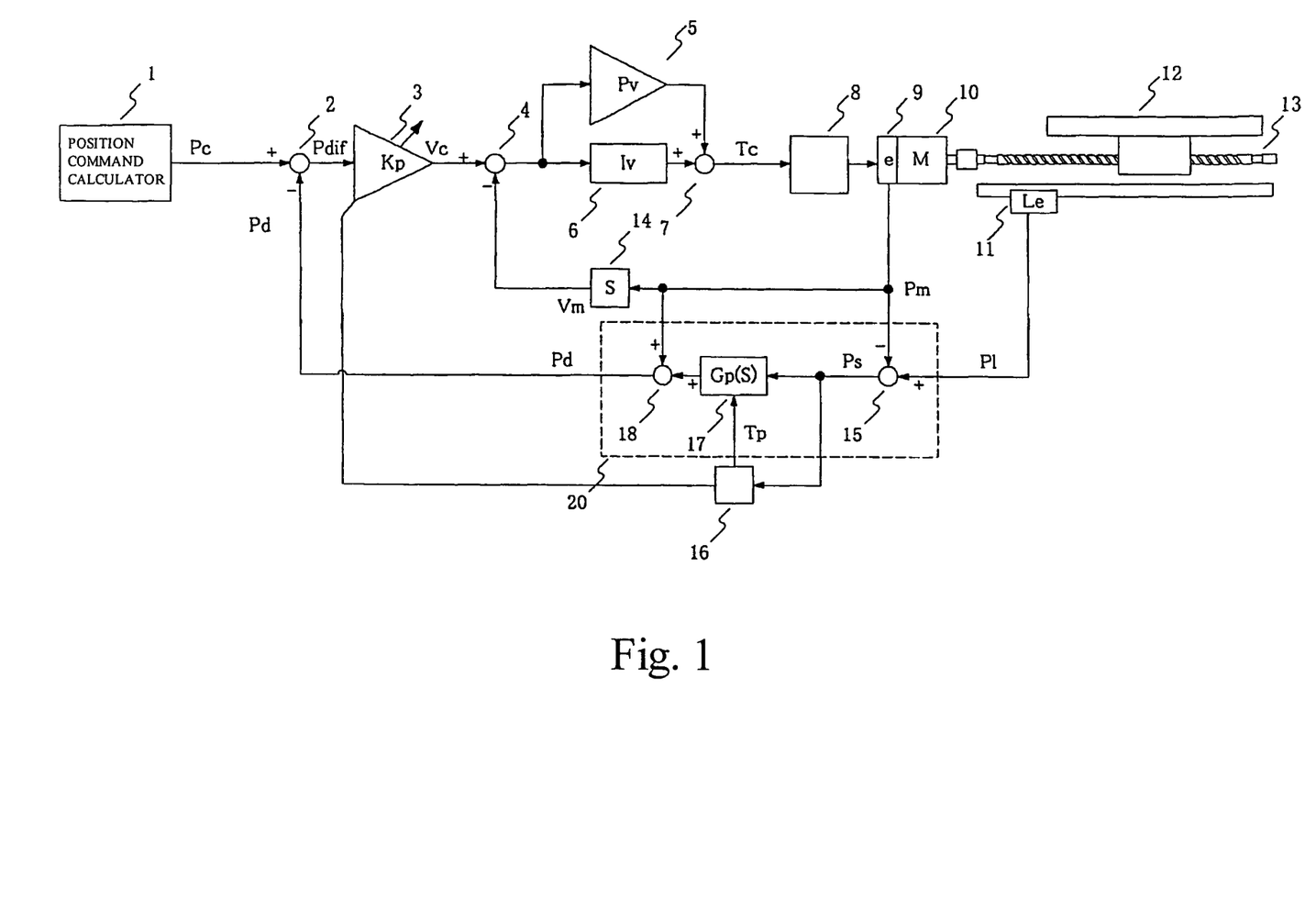
FIG. 1 illustrates a full-close control system according to an embodiment of the present invention.

Preferred embodiments of the present invention are described below. In the preferred embodiments, elements similar to those disclosed in FIG. 7 are denoted by the same reference numerals and are not described below. FIG. 1 is a block diagram illustrating a full-close control system according to an embodiment of the present invention. A subtracter 15 calculates a deflection amount Ps representing a difference between a position detection value Pl of a driven body 12 detected by a linear scale 11 and a position detection value Pm obtained from a position detector 9 attached to a motor 10. A deflection detector 16 receives the deflection amount Ps from the subtracter 15. The deflection detector 16 can change a proportional constant Kp of the speed command calculating section 3 based on the detected deflection amount Ps. Alternatively, the deflection detector 16 can change a time constant Tp of a first-order lag circuit 17 based on the detected deflection amount Ps.

Figure 2:
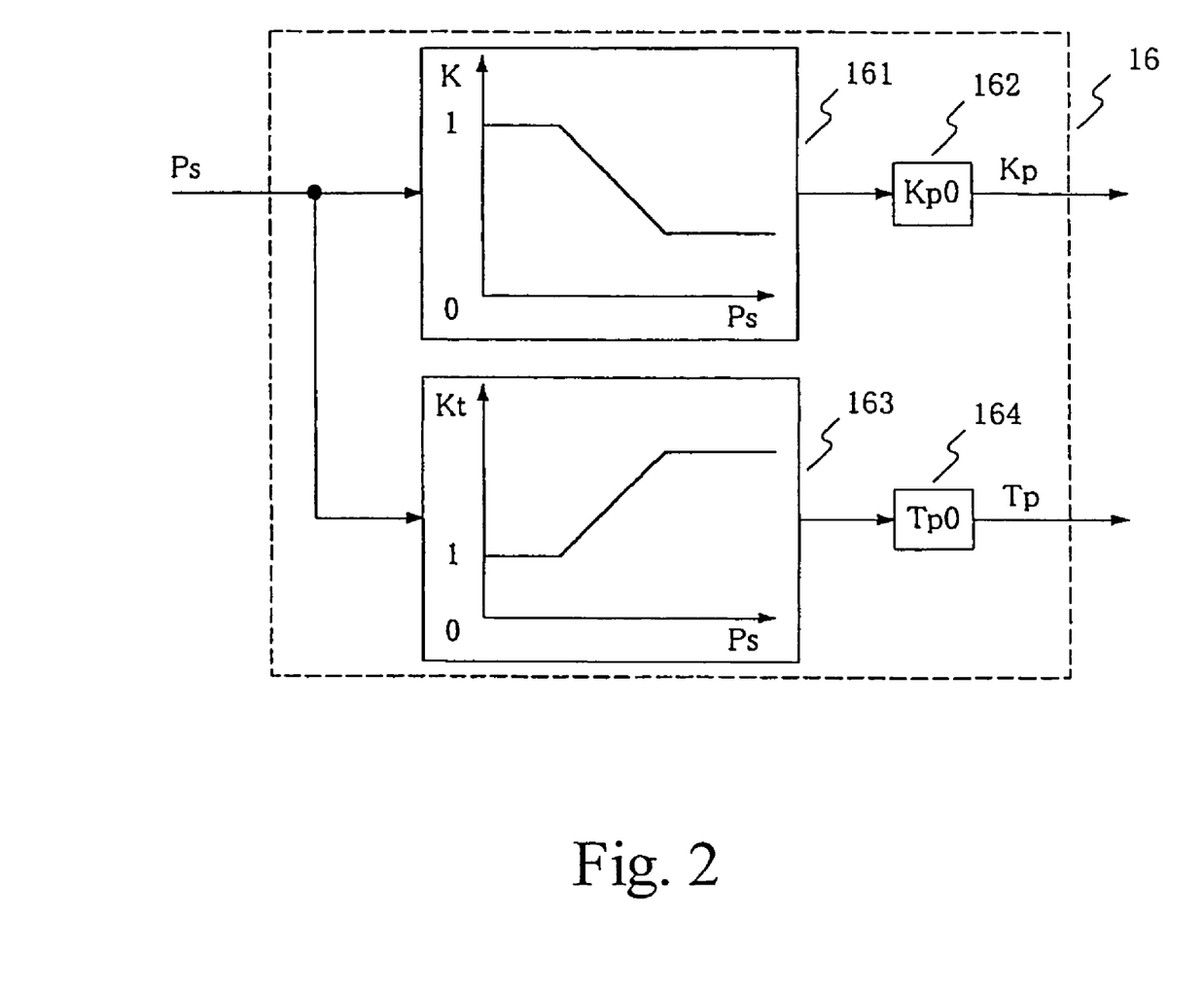
FIG. 2 is a block diagram illustrating an example of a deflection detector according to an embodiment the present invention.

FIG. 2 illustrates an arrangement of the deflection detector 16 that can change the proportional constant Kp and the time constant Tp. The deflection detector 16 outputs a coefficient K ($0 \leq K \leq 1$) based on the deflection amount Ps with reference to a table 161. A multiplier 162 multiplies the coefficient K with a proportional constant initial value Kp0 of the speed command calculating section 3, and outputs a variable proportional constant Kp of the speed command calculating section 3.

To simplify the explanation, it is now presumed that a transfer characteristic from the speed command Vc to the motor speed detection value Vm is 1. In a presumed model, the driven body position Pl and the motor position Pm are connected by a spring having a spring coefficient Kb, the driven body has a weight M, and a slide torque F is generated in the driven body. In this model, a transfer function of the entire control system can be expressed by the following formula 4, in which S represents a Laplace operator.

$$Pc(S)/Pl(S) = Kp0 \cdot K \cdot Kb/(MS^3 + FS^2 + Kb \cdot S + Kp0 \cdot K \cdot Kb)$$ (formula 4)

Figure 12:
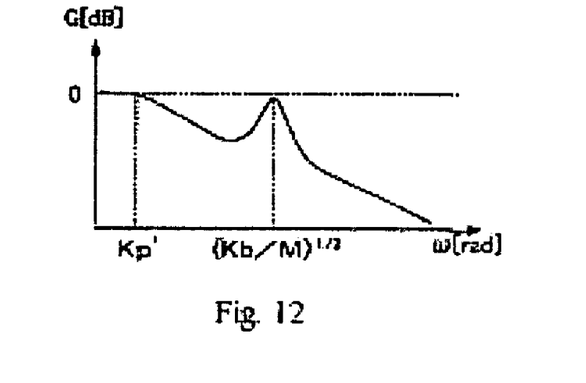
FIG. 12 is a graph illustrating gain characteristics according to the embodiment of the present invention.

According to the example shown in FIG. 1, if the rigidity of a feed shaft driving mechanism deteriorates, the deflection amount Ps becomes larger and a position proportional calculation coefficient Kp becomes smaller. FIG. 12 illustrates gain characteristics of the entire control system expressed by the formula 4 in this situation. Therefore, the gain margin at a mechanical resonance frequency $(Kb/M)^{1/2}$ becomes larger and the driven body does not cause low-frequency vibrations.

Furthermore, as shown in FIG. 2, the deflection detector 16 outputs a time constant coefficient Kt based on the detected deflection amount Ps with reference to a table 163. A multiplier 164 multiplies the coefficient Kt with a time constant initial value Tp0 and outputs a variable time constant Tp used in the first-order lag circuit 17. Namely, when the deflection amount Ps becomes larger, the time constant Tp becomes larger. The position detector calculating section 20 shown in FIG. 1 outputs a position feedback value Pd expressed by the following formula 5.

In the formula 5, Tp0 represents a time constant initial value and S represents a Laplace operator. The time constant Tp used in the first-order lag circuit 17 is $Tp = Tp0 \cdot Kt$ and the position feedback value Pd can be expressed by the following formula.

$$Pd = Pm + (Pl - Pm)/(1 + Tp0 \cdot Kt \cdot S)$$ (formula 5)

Figure 13:
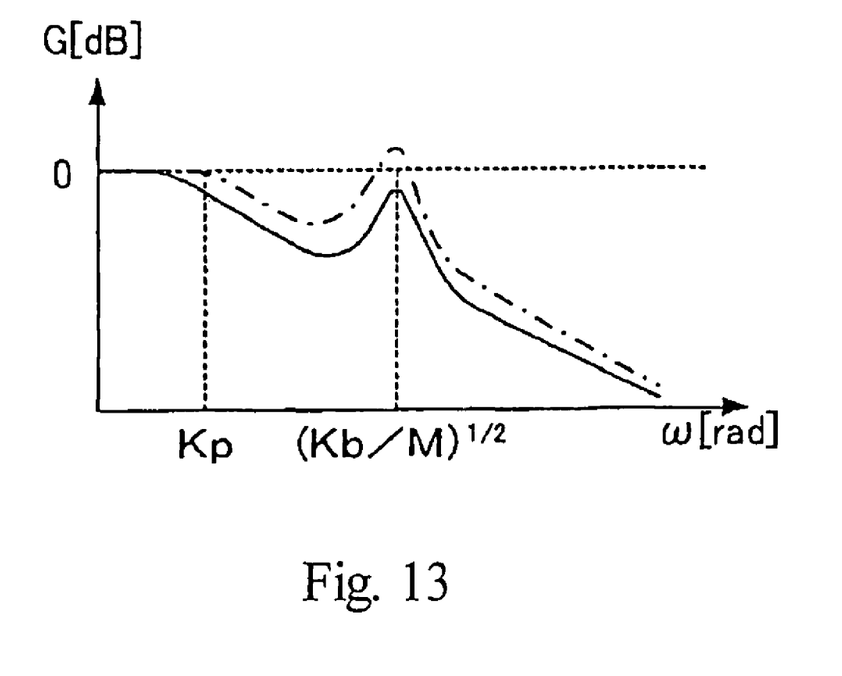
FIG. 13 is a graph illustrating gain characteristics according to the embodiment of the present invention.

In this case, if the rigidity of a feed shaft driving mechanism deteriorates, the deflection amount Ps becomes larger and accordingly the time constant Tp used in the first-order lag circuit 17 becomes a larger value. As a result, gain characteristics can be expressed by a solid line shown in FIG. 13. The gain margin at a mechanical resonance frequency $(Kb/M)^{1/2}$ becomes larger. The driven body does not cause low-frequency vibrations. In FIG. 13, an alternate long and short dash line illustrates the gain characteristics shown in FIG. 10.

Figure 3:
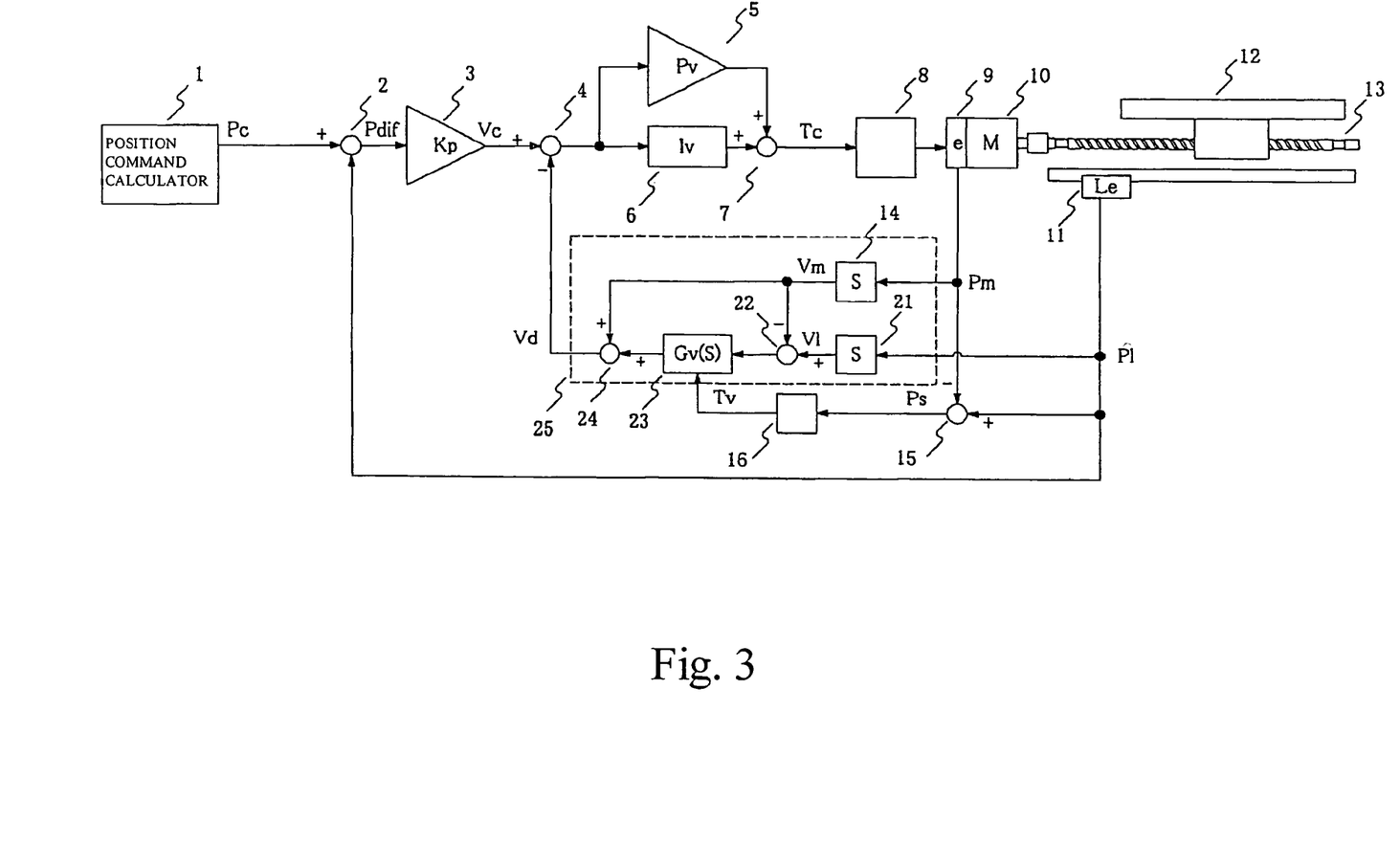
FIG. 3 illustrates a full-close control system according to an embodiment of the present invention.

FIG. 3 illustrates a full-close control system according to another embodiment of the present invention. In FIG. 3, elements similar to those disclosed in FIG. 8 are denoted by the same reference numerals and are not described below.

A deflection detector 16 obtains a time constant coefficient Kt based on a detected deflection amount Ps. Then, the deflection detector 16 multiplies the time constant coefficient Kt with a time constant initial value Tv0 to produce a variable time constant Tv used in a first-order lag circuit 23.

Namely, when the deflection amount Ps becomes larger, the time constant Tv becomes larger. A speed detection value calculating section 25 shown in FIG. 3 outputs a speed feedback value Pd expressed by the following formula 6. In the formula 6, Tv0 represents a time constant initial value and S represents a Laplace operator. In the formula 5, Tp0 represents a time constant initial value and S represents a Laplace operator. The time constant Tv used in the first-order lag circuit 23 is $Tv = Tv0 \cdot Kt$ and a speed feedback value Vd can be expressed by the following formula.

$$Vd = Vm + (Vl - Vm)/(1 + Tv0 \cdot Kt \cdot S)$$ (formula 6)

According to the example shown in FIG. 3, if the rigidity of a feed shaft driving mechanism deteriorates, the deflection amount Ps becomes larger and a time constant Tv used in the first-order lag circuit 23 becomes a larger value. As a result, gain characteristics of the entire control system shown in FIG. 3 can be expressed by a solid line in FIG. 13. The gain margin at a mechanical resonance frequency $(Kb/M)^{1/2}$ becomes larger and accordingly the driven body does not cause low-frequency vibrations.

Figure 4:
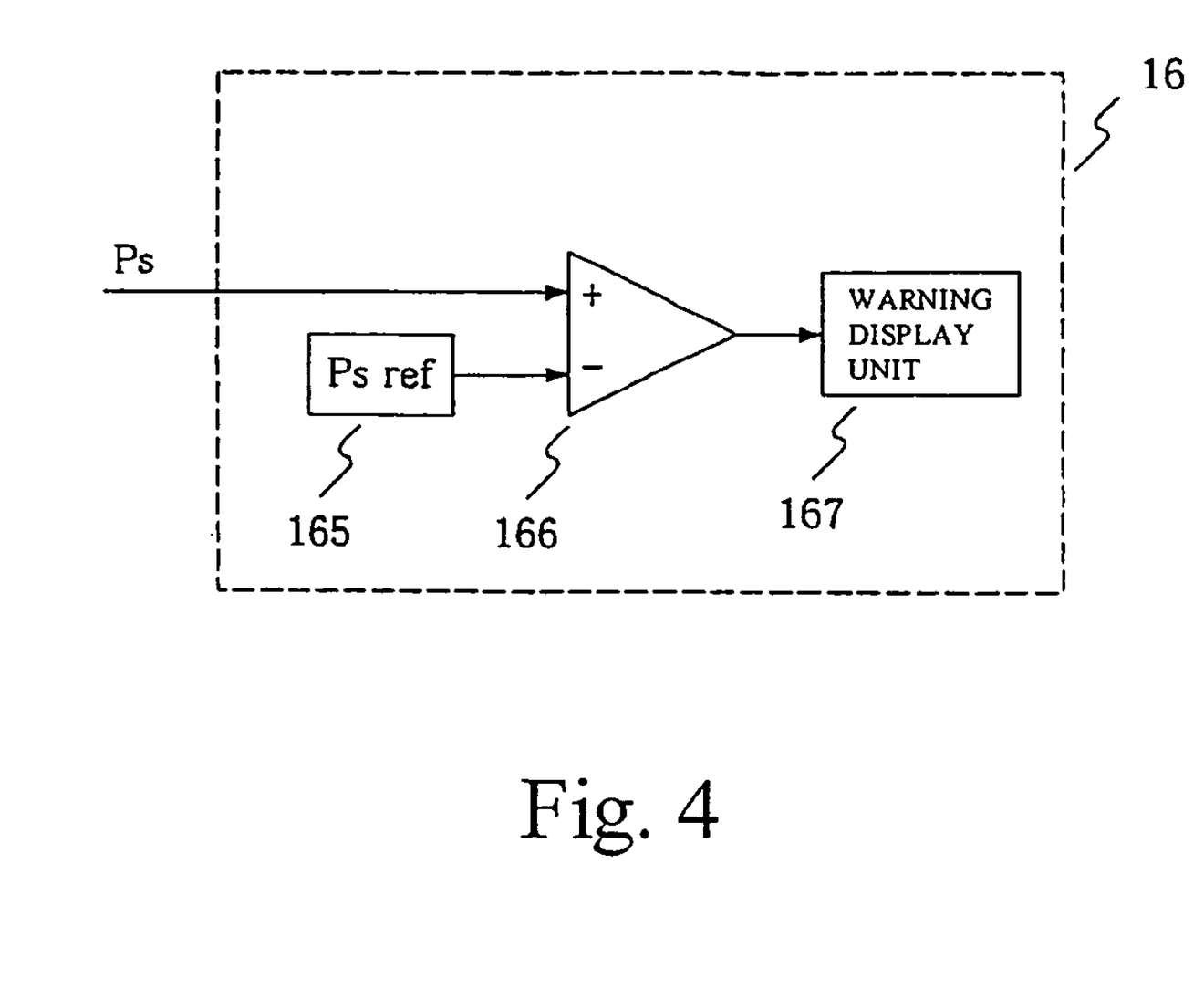
FIG. 4 is a block diagram illustrating an example of a deflection detector according to an embodiment of the present invention.

FIG. 4 illustrates an arrangement of the deflection detector 16 according to another embodiment of the present invention. The deflection detector 16 includes a differential amplifier 166 that can detect an abnormal state of the machine when the deflection amount Ps exceeds a predetermined threshold Psref 165. Furthermore, the deflection detector 16 includes a warning display unit 167 that can display an abnormal state of the machine.

Accordingly, in the event that the deflection amount Ps becomes larger due to reduction of rigidity, the deflection detector 16 can generate a warning and let an operator stop the feed shaft. Thus, the present embodiment can prevent a failed machine from being continuously driven and accordingly can eliminate damage to the parts of a feed shaft mechanism.

As described above, a deflection amount representing a difference between a driven body position and a motor position becomes larger when the rigidity of a feed shaft driving mechanism deteriorates. In the position control apparatus of the present embodiment, the deflection detector can change the position calculator proportional constant Kp or the time constant Tp of the first-order lag circuit in the position detection value calculating section in accordance with an increase of the deflection amount.

Alternatively, the deflection detector can change the time constant Tv of the first-order lag circuit in the speed detection value calculating section. As a result, the position control apparatus of the present embodiment can control the position of a driven body while suppressing low-frequency vibrations in a situation where the deflection amount increases.

Furthermore, the position control apparatus of the present embodiment can set a higher position loop gain Kp without considering reduction in the rigidity of the feed shaft driving mechanism.

Furthermore, the rigidity of a feed shaft driving mechanism gradually deteriorates due to aging deterioration. An excessively heavy workpiece may be mounted on a driven body in a large-scale machining center. In these cases, the deflection amount becomes larger. The deflection detector of the present embodiment can detect the status and prevent the machine from being damaged.

What is claimed is:

1. A position control apparatus which performs full-close control for controlling a position of a driven body driven by a motor, the apparatus comprising:

a motor position detector;

a driven body position detector configured to detect the position of the driven body;

a subtracter configured to calculate a deflection amount representing a difference between a position detection value obtained from the motor position detector and a position detection value obtained from the driven body position detector; and a deflection detector configured to change a proportional constant of a speed command calculator based on the deflection amount.

2. The position control apparatus according to claim 1, further comprising a deflection detector configured to determine whether the deflection amount exceeds a predetermined threshold and display a status of the deflection amount when the deflection amount exceeds the threshold.

3. A position control apparatus which performs full-close control for controlling a position of a driven body driven by a motor, the apparatus comprising:

a motor position detector;

a driven body position detector configured to detect the position of the driven body;

a subtracter configured to calculate a deflection amount representing a difference between a position detection value obtained from the motor position detector and a position detection value obtained from the driven body position detector;

a position detection value calculator configured to add an output of a first-order lag circuit inputting the deflection amount to the position detection value obtained from the motor position detector and output a position feedback value; and a deflection detector configured to change a first-order lag circuit time constant of the position detection value calculator based on the deflection amount.

4. A position control apparatus which performs full-close control for controlling a position of a driven body driven by a motor, the apparatus comprising:

a motor position detector;

a driven body position detector configured to detect the position of the driven body;

a subtracter configured to calculate a deflection amount representing a difference between a position detection value obtained from the motor position detector and a position detection value obtained from the driven body position detector;

a speed detection value calculator configured to add an output of a first-order lag circuit to the motor speed detection value and output a speed feedback value, wherein the first-order lag circuit inputs a difference between a motor speed detection value obtained from a motor position detection value and a driven body speed detection value obtained from a driven body position detection value; and a deflection detector configured to change a first-order lag circuit time constant of the speed detection value calculator based on the deflection amount.

* * * * *